United States Patent [19]

Jeskey et al.

[11] Patent Number: 4,778,501
[45] Date of Patent: Oct. 18, 1988

[54] PROCESS AND FURNACE FOR HEAT APPLICATION

[75] Inventors: Richard V. Jeskey, Fiskdale, Mass.; John R. Plocharczyk, Enfield, Conn.

[73] Assignee: Incom, Inc., Southbridge, Mass.

[21] Appl. No.: 47,885

[22] Filed: May 8, 1987

Related U.S. Application Data

[63] Continuation of Ser. No. 798,585, Nov. 15, 1985, abandoned.

[51] Int. Cl.$^4$ .......................................... C03B 37/025
[52] U.S. Cl. ........................................ 65/12; 65/3.11; 65/13; 264/1.6
[58] Field of Search ............... 65/2, 3.11, 3.12, 13, 65/18.2, 12; 427/163; 264/1.6, 1.1

[56] References Cited

U.S. PATENT DOCUMENTS

| | | | |
|---|---|---|---|
| 3,841,855 | 10/1974 | Montgomery et al. | 65/29 |
| 4,030,901 | 6/1977 | Kaiser | 65/2 |
| 4,061,484 | 12/1977 | Aulich et al. | 65/2 |
| 4,071,344 | 1/1978 | Blausey | 65/29 |
| 4,304,582 | 12/1981 | Aussenegg et al. | 65/12 |
| 4,578,098 | 3/1986 | Paek et al. | 65/13 |
| 4,673,427 | 6/1987 | Giessen et al. | 65/2 |

FOREIGN PATENT DOCUMENTS 2092125 8/1982 United Kingdom ............... 65/3.12

Primary Examiner—Robert L. Lindsay
Attorney, Agent, or Firm—Gerry A. Blodgett; Norman S. Blodgett

[57] ABSTRACT

Control of speed and uniformity of the heating of the working zone of the preform in a glass drawing operation in which the softening heat is applied by forced convection (13), using a separate fluid heating zone to introduce temperature and velocity controlled fluid. The size of the working zone is further controlled by changing (18) the configuration of a movable exit sleeve. Uniformity and accuracy of temperature is enhanced by normalization (10) of the temperature of the preform close to a preselected value before the preform enters the furnace.

A glass drawing apparatus embodies the preferred means to carry out the process, providing a two-chamber furnace having an air heating chamber (44) connected by air delivery channels (51) to a drawing chamber (43). The drawing chamber has preform inlet (41) and a drawn product outlet (56). Each of the latter preferably has an adjustable opening diameter. The inlet is provided with a pre-cooling collar (35). The outlet has an insulated, movable sleeve (62) controlling the effective distance from the inlet to the outlet by modifying the temperature gradient. The latter provides means for controlling the length and shape of the working zone (55).

24 Claims, 4 Drawing Sheets

PROCESS AND FURNACE FOR HEAT APPLICATION

This application is a continuation of application Ser. No. 798,585, filed Nov. 15, 1985, now abandoned.

TECHNICAL FIELD

This invention is directed to the working of softenable dielectric materials, particularly the drawing of clad and unclad fibers and fiber bundles from primary and later-stage preforms of glass. The invention particularly relates to processes for drawing glass fibers, bundles, and composite products from the fused or softened end of a preform introduced into a furnace.

BACKGROUND ART

The art of glass drawing is presently the most effective mode of producing either continuous, flexible fibers or of producing relatively short segments for later combining and processing into composite products such as fiberoptic screens, faceplates, and image modifiers of various types. Besides being used for drawing of fibers and multi-fiber bundles, drawing techniques of the type to which the invention relates are applied to late-stage processing of the composite products. Such processing includes cross-sectional reduction, either uniform or graduated, the latter technique used to form image expanders and reducers. Such processing also includes various degrees of twisting and other manipulations to form image re-orienting devices such as partial rotators, inverters, etc.

An important goal in this technical field is uniformity of heating and a high degree of temperature control in the critical softened area of the preform or workpiece. Failure of uniformity in heating the work zone is a major cause of product defect and rejection, resulting in waste of expensive materials and production time. This consideration is particularly critical in the case of a product formed from a preform of highly complex cross-sectional character in which large, sometimes sharp, gradients of optical, physical, and thermodynamic properties are likely to be present. The requirement of uniform heating reaches ultimate criticality when the conventional upper limits of heating and drawing speed and of preform and product cross-sectional dimension are reached and exceeded. It has been the unrealized goal of skilled workers in this art to produce uniform heating in the drawing furnace at the moderate temperatures needed for drawing relatively delicate composite products. Among the main reasons for failure to achieve this goal has been the difficulty of achieving uniform radiation of heat from the radiant heating elements at temperatures of around 1100° F. to 1400° F. (600° to 750° C.) Separate radiant elements produce inherently non-uniform heating. Attempts to produce a radiant source continuously surrounding the fusing area or to embed discrete elements in a diffusing matrix have not produced the desired uniformity. Moreover, most composite products do not absorb radiant energy uniformly even if it is introduced uniformly. This compounds the problem of non-uniform radiant sources, and limits the level of uniformity even for an ideal uniform radiant source.

This problem of absorbtion differential exists in any application where there are different glasses in the same product, the glasses having different infra-red absorbing characteristics (for instance the core relative to the cladding) or any product involving an extremely thick preform or drawn diameter. In the latter case, the rate of heating by absorption at the surface of the working area must be carefully regulated according to the rate of conduction of the heat toward the center of the piece. At locations toward the axis the radiant energy per se fails to penetrate at levels comparable to that at the surface.

A prior method of approximating uniformly radiating elements has been developed which involves turning the preform and the product on their common axis, at a rate sufficient to smooth out the variations in the radiational heating sources. This technique requires complex mechanisms to coordinate the turning of the preform and product, as well as the turning and lateral translation of the take-up reel if the product requires. At best, the technique produces horizontal (stratified) uniformity without producing vertical uniformity and results in hot "rings" instead of hot "spots". Moreover, the technique does not address the problem of non-uniform *absorption* by a composite product.

The problem of non-uniform absorption is especially acute when the product contains light-absorbing elements such as EMA cladding or fibers which tend to absorb infra-red radiation in disproportion to the remaining materials. Such elements, in a radiant furnace, produce internal anomalies of temperature and viscosity which limit and complicate the choice of drawing speed.

As a secondary consequence to the inability to achieve uniform heating in the drawing process, both the preform size and the reduction ratio in the drawing process are severely limited. The result is that a composite product having very small diameter fiber-optic components must be produced by a many-step process. Typically, the steps include drawing a single fiber, drawing down a multi-fiber bundle, drawing a multi-multi fiber bundle, and fusing a bundle of these latter products into a block. Such many-stage processes consume production time, and each step has its own percentage rejection rate (on the order of 20%).

Thus, the main object of the present invention is to provide a process for acting on the working area of a preform to product highly controlled, uniform heating.

Another object of the invention is to provide a process in which the limits on the size of the preform, the product, and the drawing reduction ratio are greatly extended.

A further object of the invention is to provide a process for drawing glass which allows the elimination of at least one of the successive reduction drawings in certain fiber-optic processes, without loss of quality.

Another object of the invention is to provide a process in which the size of the working zone at which reduction takes place may be chosen and controlled.

In another of its aspects, the invention provides and apparatus particularly adapted to assist in carrying out the uniform heating and control of the working zone of a drawable preform.

Further objects of the invention will become apparent as specific embodiments are described.

DISCLOSURE OF THE INVENTION

The present invention uses a controlled, high-velocity flow of temperature-regulated air or other fluid, preferably produced in a separate heating chamber and introduced into a the drawing chamber. The process takes advantage of the temperature distributing qualities of a mix of forced-and free-convection to uniformly heat the working zone of a preform. The process involves removing heat-depleted fluid, preferably by cycling the cooled fluid back to the separate heating chamber for reheating. The process involves using data from temperature sensors at critical points in the flow cycle to control fluid heating to maintain a desired smooth temperature/time profile.

In another aspect, the process involves temperature regulation of a small part of the preform just outside of the drawing chamber of the furnace in order to insure a consistently temperature-prepared preform entering the working area; this reduces the requirement to regulate ambient temperature and to compensate for different thermal conductivity of different preforms and preform clamping means. In effect, this step forms a thermal insulator which keeps the heat from the furnace from undesirable transfer up the preform.

A further aspect of the process of the invention involves controlled movement of an extendable insulation means in order to regulate the effective distance from the inlet to the outlet of the drawing chamber of the furnace, whereby the size of the working zone is regulated at will.

A still further aspect of the invention is a drawing furnace specifically adapted to carry out the process. The furnace comprises a drawing chamber with a preform inlet and outlet and a preferably separate fluid heating chamber having controllable heating means. The separate fluid heating chamber communicates with the drawing chamber by input passageways or channels, the communication mediated by forced convection means. In accordance with other aspects of the invention, the furnace is provided with a return channel communicating between the drawing chamber and the heating chamber, a pre-entry temperature regulating means at the preform inlet, and a movable insulated sleeve associated with the outlet of the drawing chamber.

In a variation of both the process and the apparatus, the preform inlet is at the bottom of the furnace, and the product is drawn upwardly from an outlet on the top of the furnace drawing chamber. The steps and elements of the variations may be independently employed.

The disclosed process and apparatus solve the technical problem of uniformly heating large-diameter drawable workpieces, possibly having complex shape in all dimensions and which, in addition, may be a composite of materials having different radiant absorbing characteristics. The high-velocity, forced-convection supply of fluid at the work zone allows transfer of heat energy to the work without the extreme differences in temperature encountered in radiant heating. Thus, the avoidance of surface hot spots or internal hot spots does not depend exclusively on the conduction rate into the workpiece or on small amounts of free convection of dead air, but can be controlled by regulation of the velocity and temperature of the forced convection currents. At a given rate of heat energy application, moreover, the technical problem of controlling the size of the work zone (which is related to the shape of the draw and the shape of the diameter reduction profile,) may be readily resolved by extension of an insulating sleeve into the forced convection flow pattern.

BRIEF DESCRIPTION OF THE DRAWINGS

Both the process and the apparatus of the present invention may be best understood by reference to specific embodiments as shown in the drawings, which are illustrative and not limiting.

DETAILED DESCRIPTION

There are several modes of carrying out the process of the present invention in which some of the details depend upon the product being made and the raw materials being worked. The following is a detailed description of successful applications, including the best mode contemplated at present. A detailed description of an apparatus specifically designed for carrying out the process is also laid out here.

Figure 1:
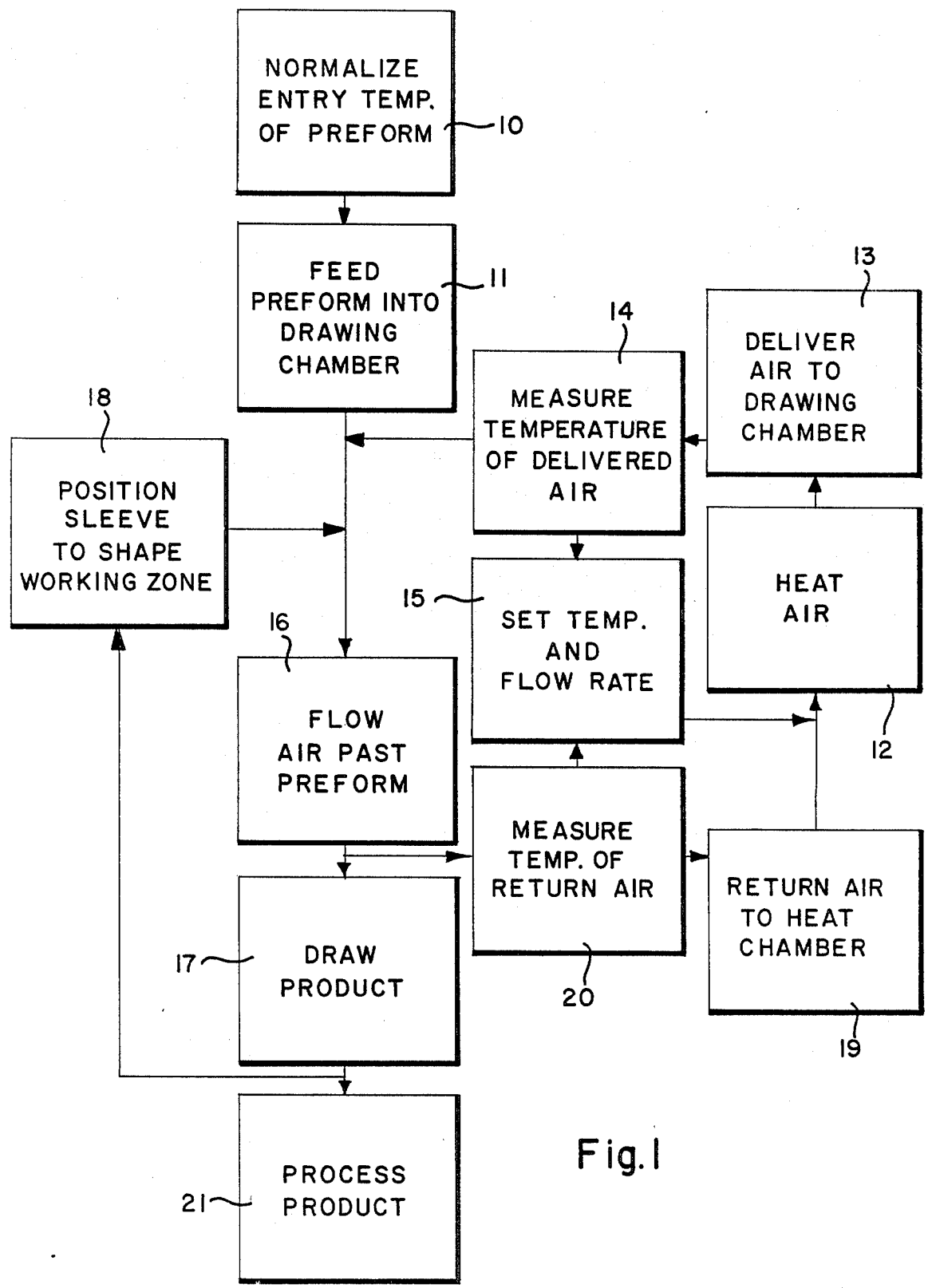
FIG. 1 shows a flow diagram of an embodiment of the process of the present invention.

The process diagram shown in FIG. 1 outlines the basic steps in the general process. Since the process allows very close control of the preform heating, based on calculated and experiential air temperature and flow-rate data, optimal use of the process first requires a certain degree of pre-entry temperature control of the preform. This pre-entry temperature conventionally depends not only on ambient temperature (control of which is inefficient) but also on the conduction rate from prior furnaces through the preform and its feeding mechanisms. The effect of these factors is reduced in the process of the present invention by the step of bringing the temperature of the preform close to a "normalized" temperature just before it enters the furnace. This will most often be a cooling step, although at some stages in the process and for some ambient conditions there may be mild warming. The simplest embodiment of this temperature normalizing step 10 involves bringing more or less constant temperature air from a source and blowing it onto the periphery of the preform at the entry point to the furnace. At the same time, the preform is fed into the furnace drawing chamber in a feeding step 11 using available feeding mechanisms. These include motor driven drive screws. The mechanism may include several of these drive screws if the core and a cladding or a plurality of claddings must be driven at different rates. It is not necessary for these mechanisms to include rotating means. Such means were a complicating expedient to achieve furnace uniformity as mentioned above and have had only qualified success.

The crux of the present invention involves the step of heating air or other heat exchange fluid in a chamber, preferable separate from the chamber in which the fiber drawing will take place. If the chamber is not separate, at least the working zone should be shielded from any radiant elements used therein. The heated air is then introduced or delivered 13 into the drawing chamber using controllable forced convection means: fans, air pumps, etc. The air heating step 12 is preferably controlled (for instance by variable resistance or by introducing a controlled cool gas stream) under the guidance of a temperature measurement step 14. This measurement is preferably carried out as the air is introduced into the drawing chamber. This measurement, which is carried out for example by inserting a thermcouple into the air flow pattern, controls the air heating means by a preselected algorithm, mediated by electrical or electronic processing means. These may involve feedback or feedforward processing with calculated or tabulated parameters, leading to a discrete or continuous heat control setting step 15. This step may also encompass control of variation of the flow rate of the heated air. The goal is the development of a temperature/time profile appropriate for the uniform heating of a given preform in a given working zone. To this end, the heated air is directed to flow past the working zone of the preform, step 16. The preferred mode of flow is rather turbulent, but with a directional trend through the working zone in a distinct direction. It is also preferable that the inflow be distributed around the periphery of the preform inlet end of the drawing chamber.

When the preform is at working temperature, the reduced diameter product is drawn in the usual manner, using combinations of gravity and traction in a drawing step 17. Since the rate of drawing and the degree of reduction in diameter of preform product depend (among other factors) on both temperature profile and the length of the working zone, an additional working zone shaping step 18 may be employed. The working zone shape may be set before the drawing begins or may be adjusted at various stages of the drawing process according to the requirements of the product and/or the character of the preform.

A successful method of shaping the working zone involves varying the effective distance from the inlet of the drawing chamber to the effective outlet. Specifically, this may be accomplished by positioning an insulating sleeve which is capable of variable extension from the outlet of the chamber toward the inlet, concentrically of the axis of the draw.

To facilitate temperature control, the heated air which has been flowed past the working zone may be withdrawn from the chamber in an air return step 19 to be reheated in the heating chamber. If an additional air temperature measurement step 20 is performed on withdrawal of the air, refinement of the heat setting control may be made. Such an adjustment may be made, for example, on the basis of calculation of absorbed heat from the temperature differential.

After drawing of the product, the usual product processing is carried out, indicated generally as step 21. For continuous fiber, a rotating and reciprocating take-up reel may be provided. Additional coatings may be applied. For more discrete product, means may be provided for periodic cutoff of draw segments, either as quasi-finished product or for bundling into multi- and multi/multi-element composites for further processing.

Because this process allows the drawing of very large diameter product from very large diameter preforms due to the extraodinarily uniform heating that the process provides, it has been found to be possible and advantageous to feed the preform up from below the furnace and draw the product up from above. This process variation advantageously modifies the effect of gravity on the working zone shape and on the take-up qualities of the product. The variation is especially applicable in a working zone which is relatively long with a slow taper.

The general process of this invention has been applied without any extraordinary control measures to a composite preform over 4.5 inches (12 cm) in diameter which was drawn down to a diameter of 0.030 inches (0.080 cm) in one stage. The preform was normalized to about 70° F. (21° C.). Air was heated so that it could be delivered to the drawing chamber at about 1380° F. (750° C.). The air was forced at a high velocity past the working zone and withdrawn at about 1375° F. (747° C.). The rate of production and the quality of the product were at least comparable to conventional radiative drawing which would have required multiple stages for this reduction.

In another case the uniformity of heating in this process allowed a one-step production of a one-inch product from a three-inch preform with excellent quality and production rate. The preform was introduced from below the furnace and taken up from above.

No apparent limit has been found to the size of preform to which the process may advantageously be applied. When applied to conventional drawing processes, the production rate approaches 5 to 6 times the usual rate and is presently limited by the capacity of available or readily modified take-up mechanisms.

The ability of this system to deliver heat effectively to large diameter workpieces in the normal drawing operation without distortion in the workpiece allows use of the system in a remarkable manner. Ordinarily, large diameter products formed of large numbers of fine fibers are formed by a very inefficient process involving stacking of the fibers and the fusing of the fibers under heat and very high pressure to remove voids. It has been found that these large diameter products can be formed far more efficiently in the following manner. First, a preform is formed by stacking fibers into a bundle with a diameter slightly larger than the desired product. The bundle is then enclosed in a gas-tight glass envelope which is then evacuated. The resulting preform is then passed through the furnace in the manner of this invention except that the preform is only drawn down a small amount to the desired diameter. The result is a large diameter product formed of uniformly fused, voidless and undistorted fibers. This product is capable of being sliced into gas-tight plates. In practical operation, it may be necessary to continuously evacuate the envelope during the draw. Because of the very low distortion caused by this draw, it is possible to apply a twisting motion to the workpiece in the draw zone. This results in a product in which the fibers have a uniform spiral orientation. The resulting product can be cut to form image rotators or inverters.

APPARATUS

Figure 2:
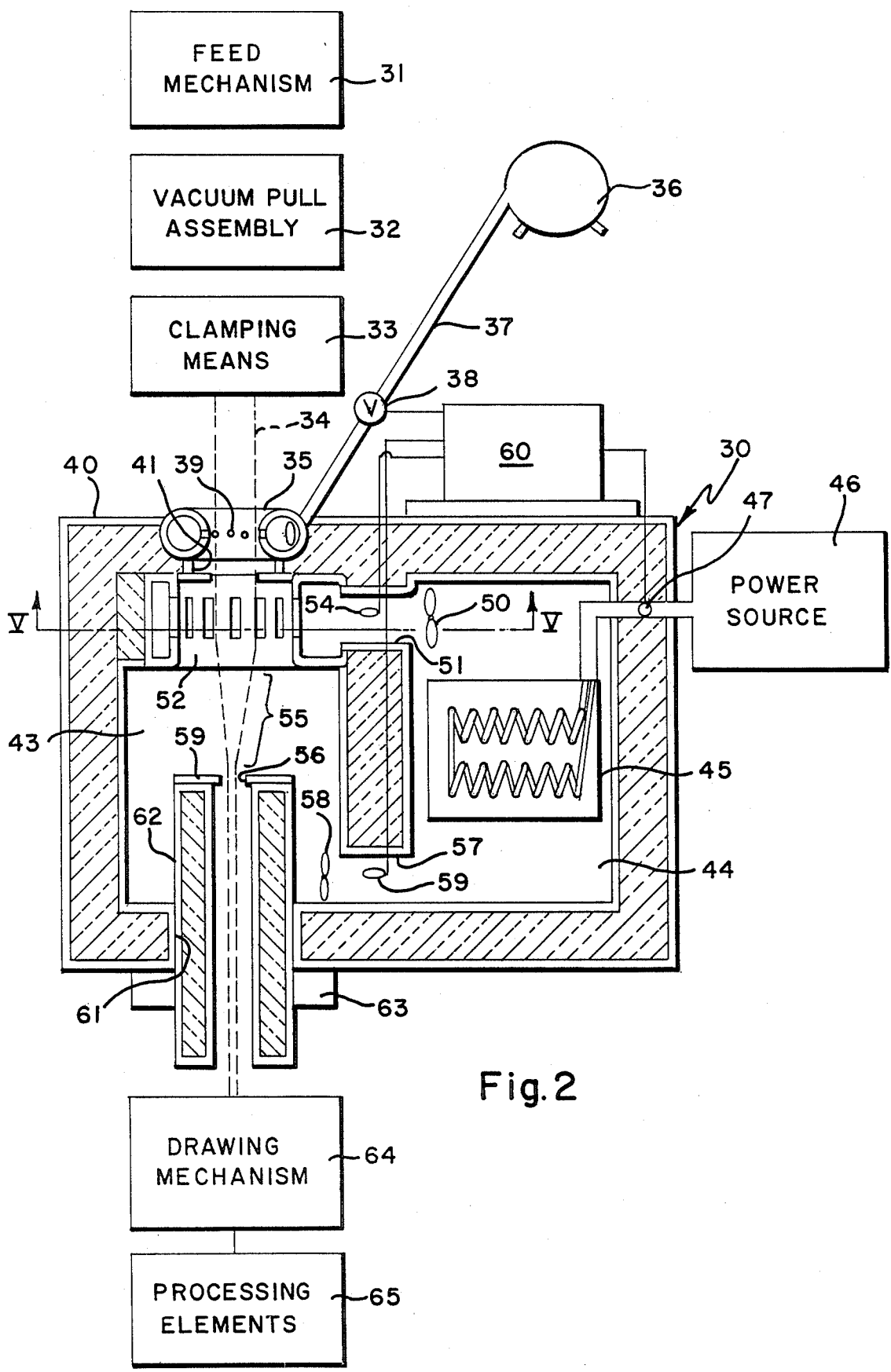
FIG. 2 is a sectional view of a furnace embodying the principles of the present invention.

An apparatus specifically designed to carry out the process of the present invention is disclosed in FIGS. 2–7 and is shown most comprehensively in a modified schematic manner in FIG. 2.

Although forced convection ovens have been available in the past, the furnace of the present invention is disclosed in unique combination with other elements and in configuration adapted to utilize the special properties of forced convection in a glass drawing operation. The application of the forced convection heating to the glass drawing art have resulted in extraordinary, unexpected, and surprising increase in the diameter capacity, drawing rate and quality (in terms of product rejection rates) of this art.

The general combination as illustrated in FIG. 2 and indicated generally by the numeral 30, includes a complex of feed mechanisms 31, preferably having a capacity for differential feeding of various components of a composite preform. The feeding complex may include a vacuum pull assembly 32 including the required gas tight seals, and clamping means 33. The workpiece of the apparatus is a heat softenable, drawable preform 34. To carry out the temperature normalization or "precooling" of the preform just before entry into the furnace (indicated generally by 40) this embodiment includes a hollow collar 35 or thermal isolator which is supplied with relatively constant temperature air from a source 36 via a conduit 37 with controllable valve 38. The "pre-cooling" air is directed inwardly toward the preform through a plurality of inwardly facing, radially directed apertures such as 39. It has been successful and convenient to choose, as a standard, a temperature near room temperature of 70° F. (about 21° C.). To achieve a finer degree of control over keeping the preform temperature constant, temperature sensors above and/or below the collar could be provided to control pre-cooling air temperature and/or volume.

The preform 34 is fed into the furnace 40 through a drawing chamber inlet 41. This inlet is preferably supplied with diameter adjusting means 42 such as a fairly refractory "iris" assembly, to insure moderate resistance to heat loss.

The drawing chamber 43 is one of two chambers which this embodiment of the furnace comprehends, the other chamber being the separate air heating chamber 44. The heating chamber is supplied with heating means which may be combustive, inductive, arc-induced, dielectric, etc., but in the preferred embodiment comprised large area resistive coils 45. These are supplied with power from a source 46 and a control mechanism 47 such as variable impedance or a variable transformer.

A forced convection element 50 (a high temperature fan, pump, etc.) draws air through the heating elements and directs a flow through a channel 51 which communicates with the drawing chamber 43. This delivery is preferably mediated by a distribution means 52 such as an internally, radially perforated plenum.

At a point along the path of flow, a temperature sensing transducer means 54 is provided sending its signal to a central control system 60.

The flow of air is actively or passively drawn past the preform/workpiece to create the working zone 55 terminating at or near the effective drawing chamber outlet 56. The flow continues through a return channel 57 which may be provided with a return forced convection element 58 and a return air temperature sensing transducer means 59 also sending to the central control 60.

The effective drawing chamber outlet may be provided with diameter adjusting means 59 similar to the means 42 at the inlet.

The effective drawing chamber outlet 56 is distinguished from the actual outlet 61 by an insulating sleeve 62 which movably engages the actual outlet and extends into the drawing chamber toward the inlet 41. When the product is drawn past the inner end of this sleeve, the product is shielded from the heated flow. This movable point thus defines the end of the working zone 55. The position of the sleeve may be temporarily fixed as by set screws or clamps, or may be under variable central control effected by extension means 63 such as servo-activated rack and gear or friction wheels.

The product is drawn in the usual manner by a drawing mechanism 64 which employs gravity, traction means, etc. The product is then passed on to further processing elements 65: take-up reels, cutters, bundlers, slicers, etc.

Figure 3:
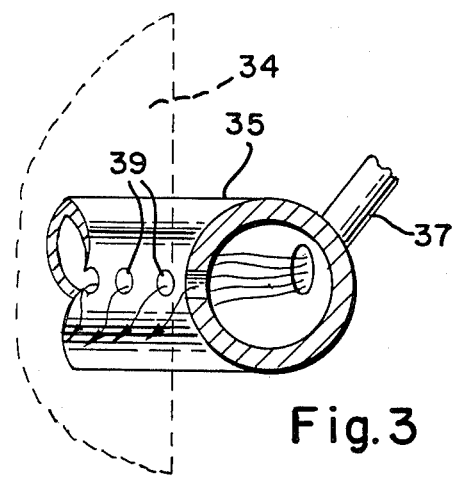
FIG. 3 illustrates a simple embodiment of part of a pre-cooling collar.

An effective pre-cooling collar 35 may be constructed as detailed in FIG. 3. Compressed air of relatively constant temperature is brought via a conduit 37 from a constant temperature air source such as an air compressor into the collar and is directed inward toward the preform through radial apertures 39.

Figure 4:
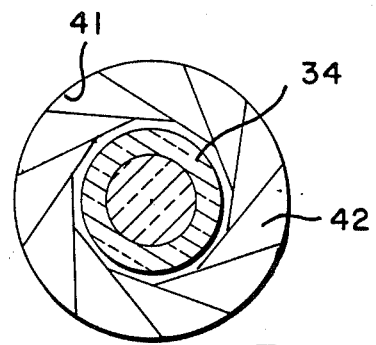
FIG. 4 is a top elevational view of a preferred form of the drawing chamber inlet with adjustable diameter means.

The detailed view in FIG. 4 looking down on the drawing chamber inlet illustrates an embodiment of an adjustable diameter means 42 for causing the effective inlet diameter to approximate that of the preform 34 (shown as a typical single cladding fiber-optic preform.) A similar mechanism can be used for the diameter adjusting mechanism 59 of the effective outlet 56.

Figure 5:
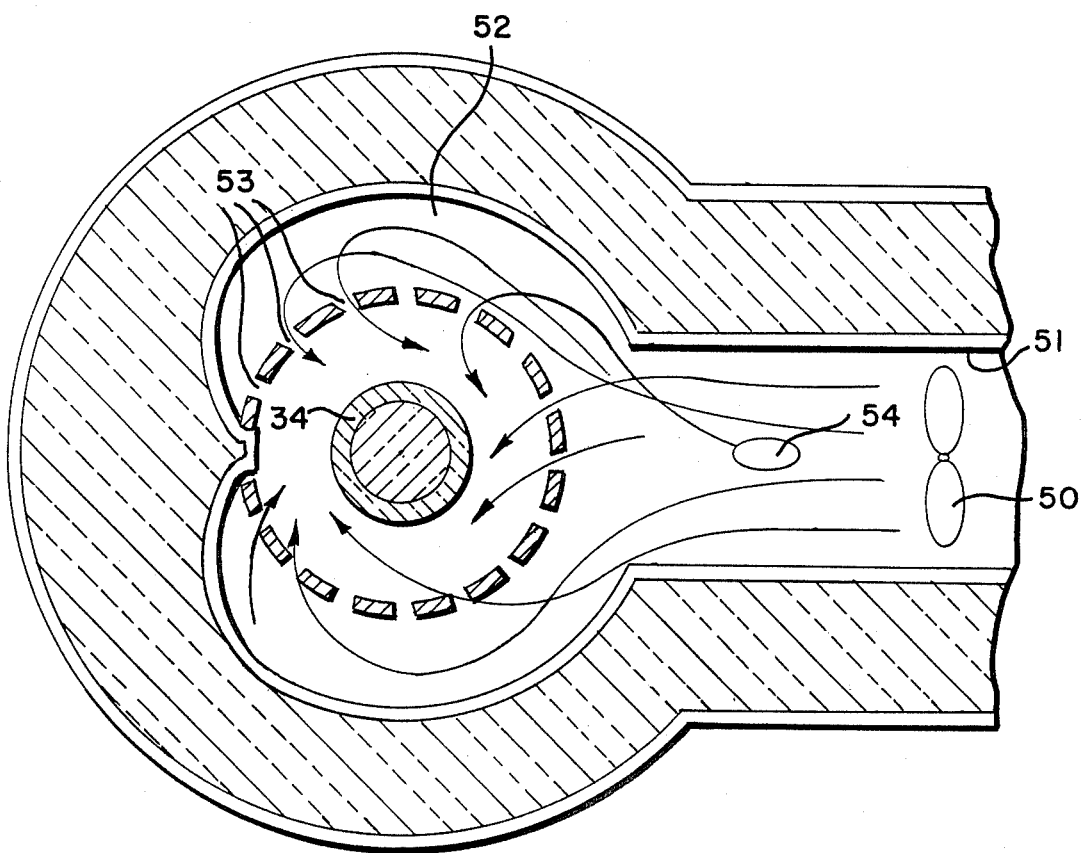
FIG. 5 is a sectional view on the line V—V of FIG. 2 showing an embodiment of the heated fluid distribution means.

FIG. 5 shows a detailed horizontal section on the line V—V of FIG. 2 of a flow distribution means 52 embodied in a toroidal plenum with internal radial perforations 53 shaped to facilitate flow control. In the preferred embodiment, the perforations would be elongated along the axis of the workpiece.

Figure 6:
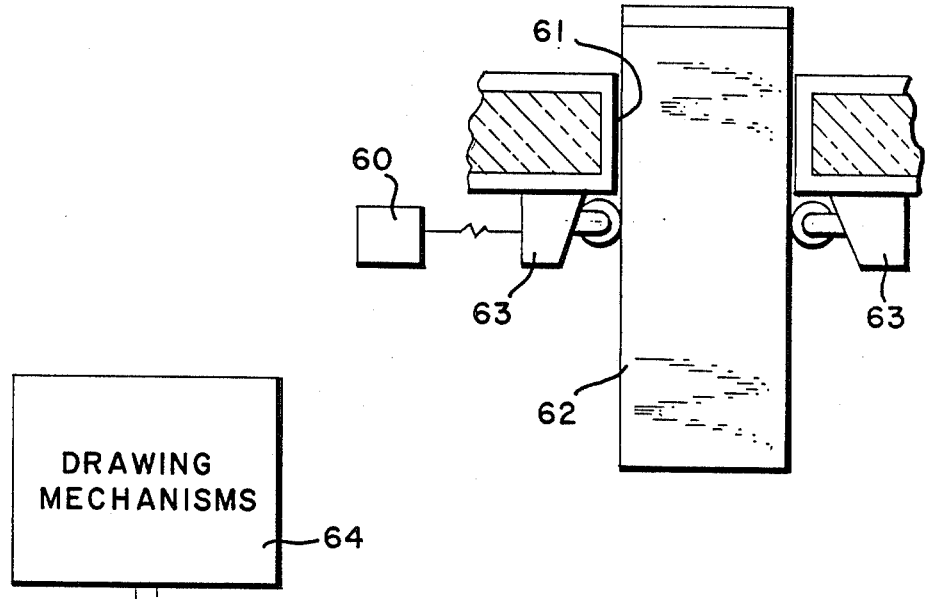
FIG. 6 illustrates the action of the adjustable insulated sleeve.

A detail of a dynamic embodiment of the adjustable sleeve 62 is shown in FIG. 6 with an adjustment for a shortening of the working zone in broken lines. Adjustment is made by extending means 63 under central control 60. The extending means are preferably annular.

The process variation which involves feeding the preform from below the furnace and drawing the product from above may be carried out satisfactorily on the apparatus of FIG. 2. Full advantage of this invention may best be taken under the circumstances, however, by the apparatus variation shown in FIG. 7. In this variation, the furnace is so mounted, as by the use of gimbles 70, 71, that it may be rotated at will in a vertical plane. In this case, the feed mechanisms 31 and the drawing mechanism 64 are relocated to their respective appropriate locations as shown in the figure.

Figure 7:
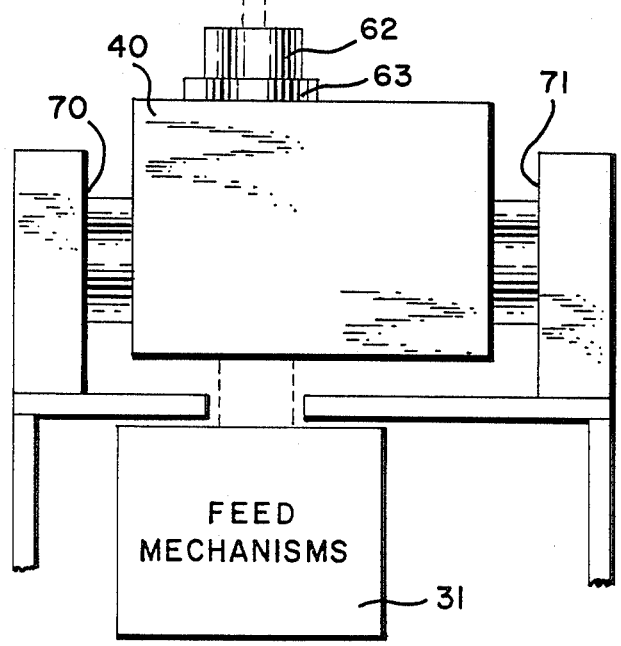
FIG. 7 shows a modified apparatus designed to be capable of carrying out the drawing operation upward instead of downward.

As an alternative to the rotatable configuration shown in FIG. 7, the apparatus may be built with a symmetry about a central horizontal plane. Thus, the input channel from the heating chamber to the drawing chamber, as well as the flow distribution means, may be located centrally. The "inlet" and "outlet" areas of the drawing chamber may then be identically supplied with closable return channels, extendable insulated sleeves, pre-cooling collars, and aperture diameter adjusting means. In this way the preform may be fed and the product drawn upward or downward with equal ease. The choice will depend upon the character of preform, product, and production rate.

INDUSTRIAL APPLICABILITY

Some of the modes of industrial applicability of the uniform heating provided by the drawing process of the present invention are readily apparent from the above description of the equipment and its characteristics, while other uses and advantages are totally unexpected.

A typical product rejection rate of about 20% at each step of a multi-step manufacturing process obtains in present radiation furnaces. The process and apparatus of the present invention have significantly reduced this rejection rate.

The drawing rate for moderate diameter products has been greatly limited by the need for a slow enough rate to allow complete and reasonably uniform heating of the preform. The present process heats even large diameter preforms quickly and uniformly to the point that some product can be taken up at rates 5–6 times to that of conventionally configured drawing furnaces, with more than satisfactory quality.

The present process does not generally require special treatment of products which incorporate radiation absorbing claddings and fibers as compared to with the treatment required of such products in radiative furnaces. Such products include most composite image manipulating products: faceplates, image expanders, inverters, etc.

Most significantly, in prior art processes, the normal composite product is produced in several stages. This is due to limitations in the size of the reduction ratio of the product to preform which can be achieved without distortion. There has also been an absolute size limit of the preform that can be heated with threshhold uniformity. The present process can uniformly heat the working zone of a preform, including a composite preform, of at least up to 4.5 inches (12 cm) and possibly much larger. This means:

1. At fairly ordinary product-to-preform ratios, a final product of large diameter may be drawn, possibly eliminating the final pressing, annealing, devoiding, and shaping steps,
2. Advantage can be taken of the vastly larger reduction ratios possible to eliminate one or more stages of the production of multi-multi-type composite products. The elimination of such steps saves time and labor, as well as the cost of materials lost through inevitable waste and rejection.

Clearly, minor changes may be made in the form and construction of this invention and in the embodiments of the process without departing from the material spirit of either. Therefore, it is not desired to confine the invention to the exact forms shown herein and described but it is desired to include all subject matter that properly comes within the scope claimed.

The invention having been thus described, what is claimed as new and desired to be secured by Letters Patent is:

1. A process for drawing a fiber or fiber-bundle product from a preform of heat-softenable, drawable material having a drawing temperature and a working zone, comprising the steps of:
   (a) feeding the preform into an inlet in a drawing chamber,
   (b) heating a gaseous fluid to a temperature at or above the drawing temperature of the preform using heating means which are substantially completely radiatively shielded from the preform working zone,
   (c) causing the heated fluid to flow past the preform working zone until the preform is at drawing temperature in a working zone, and
   (d) drawing the product from the preform through an outlet in the drawing chamber.

2. A process as recited in claim 1, further comprising the steps of heating the fluid in a separate heating chamber and actively delivering the heated fluid to the drawing chamber.

3. A process as recited in claim 2, further comprising step of: after the heated fluid has flowed past the working zone, drawing the fluid back to the heating chamber to be reheated.

4. A process as recited in claim 3, further comprising the steps of:
   measuring the temperature of the heated fluid at a chosen location at least of discrete time intervals, and using the measured temperature values to adjust said fluid heating step and the rate of said delivery step.

5. A process as recited in claim 1, further comprising the step of: bringing a portion of the preform about to enter the drawing chamber to a pre-selected control temperature.

6. A process as recited in claim 1, further comprising the step of: shaping the working zone by introducing an insulating means from the outlet of the drawing chamber a pre-selected distance toward the inlet of the chamber to form an effective outlet beyond which the drawn product is insulated from the heated flow of fluid.

7. A process as recited in claim 1, wherein the preform is fed upward from below the drawing chamber and the product is drawn upward from above the drawing chamber.

8. A process as recited in claiam 1, wherein the preform is a bundle of drawable elements.

9. A process as recited in claim 8, further comprising the step of forming a preform having a cross-sectional dimension relatively slightly larger than the desired final dimension of the product, and wherein the product is drawn just sufficiently to fuse the bundle into a voidless, integral mass.

10. A process as recited in claim 8, wherein the bundle is encased in a gas-tight envelope, the process further comprising the step of pulling a vacuum on the bundle while drawing the product.

11. A process as recited in claim 10, further comprising the step of forming a preform having a cross-sectional dimension relatively slightly larger than the desired final dimension of the product, and wherein the product is drawn just sufficiently to fuse the bundle into a voidless, integral mass.

12. A process as recited in claim 8, further comprising the step of:
   while drawing the product from the preform, twisting the bundle through a pre-selected angle.

13. An apparatus for drawing a preform of heat-softenable, drawable materials having a drawing temperature into a fiber or fiber-bundle product, comprising:
   (1) a furnace having,
      (a) a drawing chamber,
      (b) a fluid-heating chamber containing gaseous fluid-heating means which means are substantially completely radiatively shielded from the preform working zone,
      (c) a forced convection element to deliver fluid from the heating chamber to the drawing chamber,
      (d) a drawing chamber inlet,
      (e) a drawing chamber outlet,
   (2) preform feeding mechanism adapted for feeding the preform into said inlet, and
   (3) a product drawing mechanism adapted for drawing the product out of said outlet.

14. Apparatus as recited in claim 13, further comprising means of bringing the preform to a normalized temperature at the drawing chamber inlet.

15. Apparatus as recited in claim 14, wherein the means for bringing the preform to a normalized temperature include a fluid source connected by a conduit to a collar around the drawing chamber inlet, the collar having inwardly directed apertures.

16. Apparatus as recited in claim 13, further comprising an insulated sleeve extending from the drawing chamber outlet toward the drawing chamber inlet and having adjustable extension, the sleeve forming an effective outlet from the heated flow of fluid for the drawn product.

17. Apparatus as recited in claim 13, further comprising a temperature measuring means located in the flow of heated fluid.

18. An apparatus as recited in claim 13, further comprising a central control mechanism functionally connected with the temperature measuring means and controlling the fluid heating means and the forced convection element and, through them, controlling the heat delivered by the flow of heated fluid.

19. Apparatus as recited in claim 18, wherein the central control mechanism is functionally connected to and controls the insulated sleeve adjusting means.

20. Apparatus as recited in claim 13, wherein the preform is formed of a bundle of elements and the apparatus includes a gas-tight and evacuated envelope which encloses the preform.

21. An apparatus as recited in claim 13, wherein the elements comprising the furnace are distributed symmetrically of a horizontal plane whereby the preform may be fed and the product drawn from either the inlet or the outlet respectively.

22. An apparatus as recited in claim 16, having an insulated sleeve extending both from the drawing chamber outlet toward the drawing chamber inlet and from the drawing chamber inlet toward the drawing chamber outlet.

23. An apparatus as recited in claim 13, in which the feeding mechanism, the furnace, and the drawing mechanism are mounted on gimbles, whereby the entire assembly may be pivoted in a vertical plane.

24. A process for applying heat to a workpiece longer than a treatment area of a furnace, the workpiece having a treatment temperature, comprising the steps of:
  (a) feeding the workpiece continuously into an inlet in a treatment chamber,
  (b) heating a fluid to a temperature at or above the treatment temperature of the workpiece, using heating means which are shielded from the workpiece,
  (c) causing the heated fluid to flow past the portion of the workpiece in a treatment zone so that said portion of the workpiece is at treatment temperature, and
  (d) continuously drawing the treated portion of the workpiece through an outlet in the treatment chamber.

* * * * *